United States Patent Office 3,326,332
Patented June 20, 1967

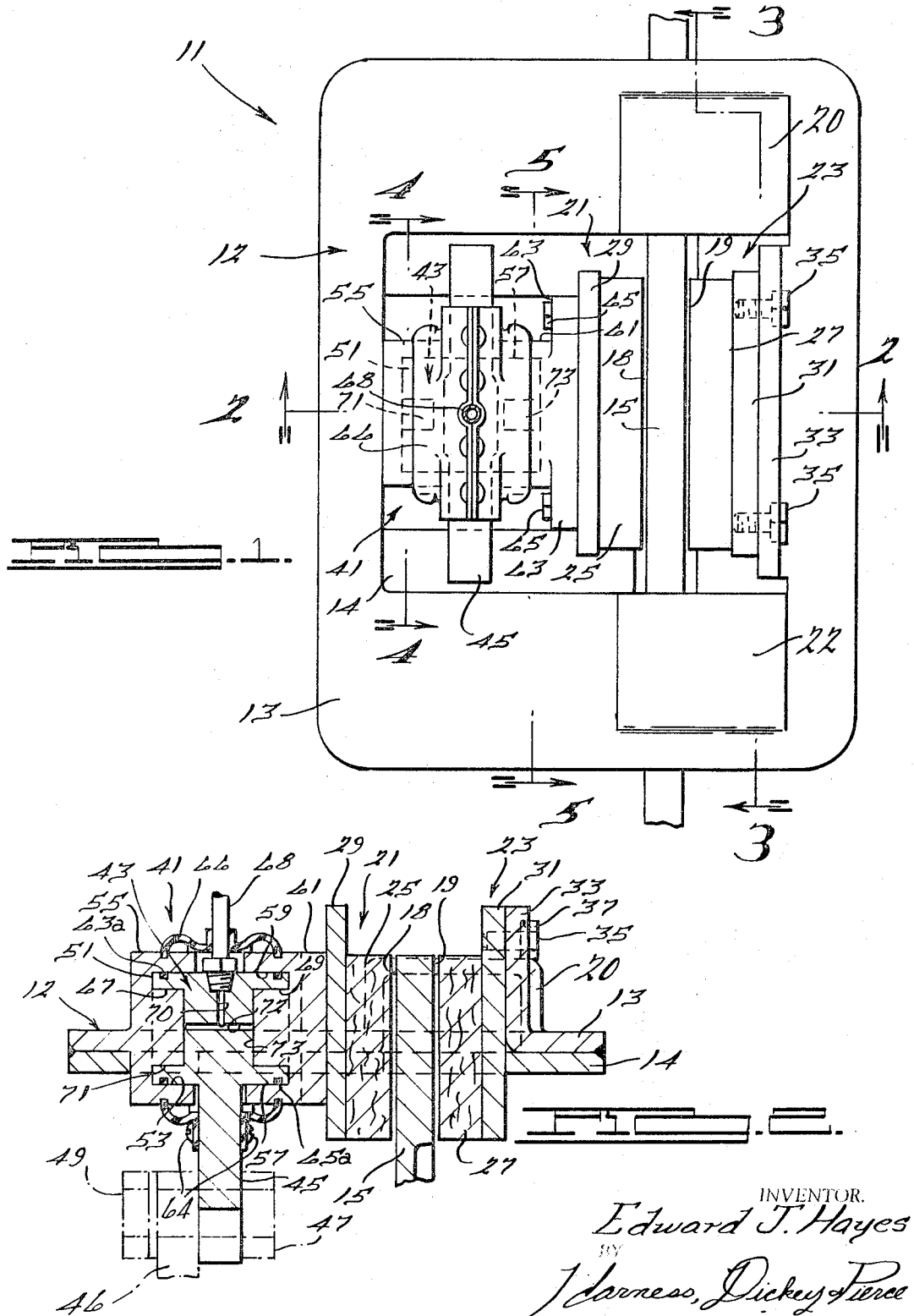

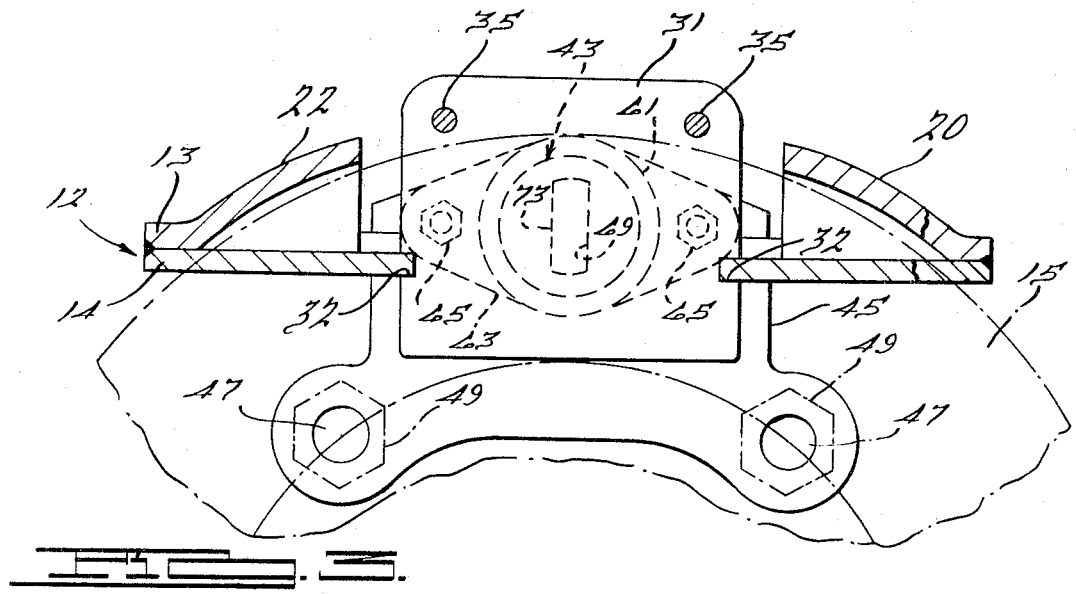
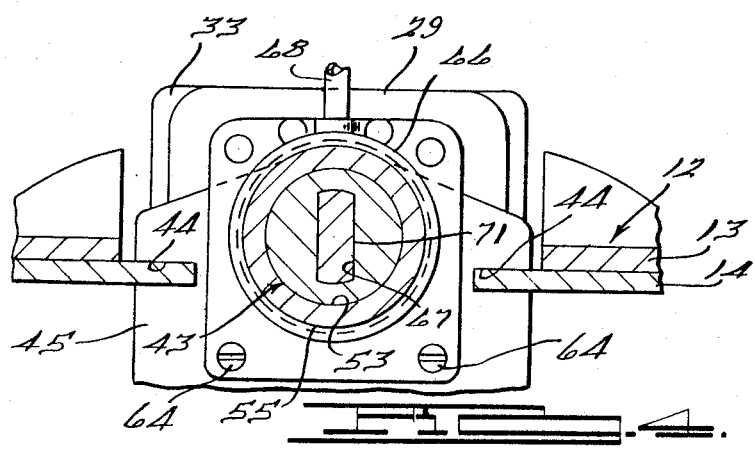
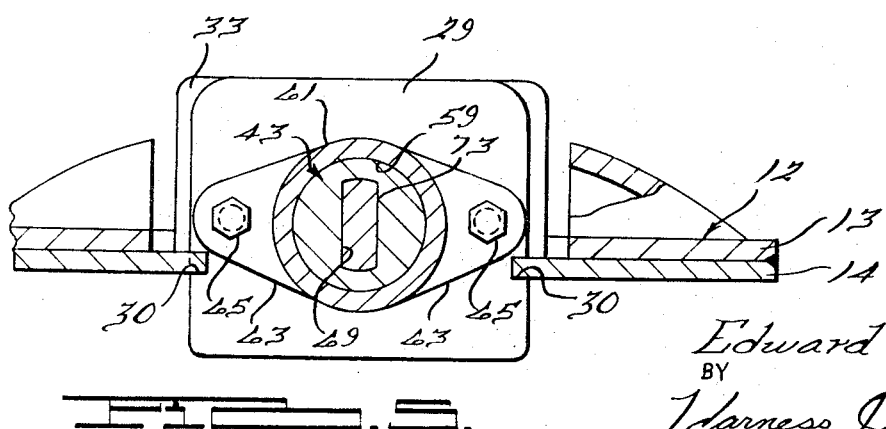
INVENTOR.
Edward J. Hayes
BY
Harness, Dickey & Pierce
ATTORNEYS.

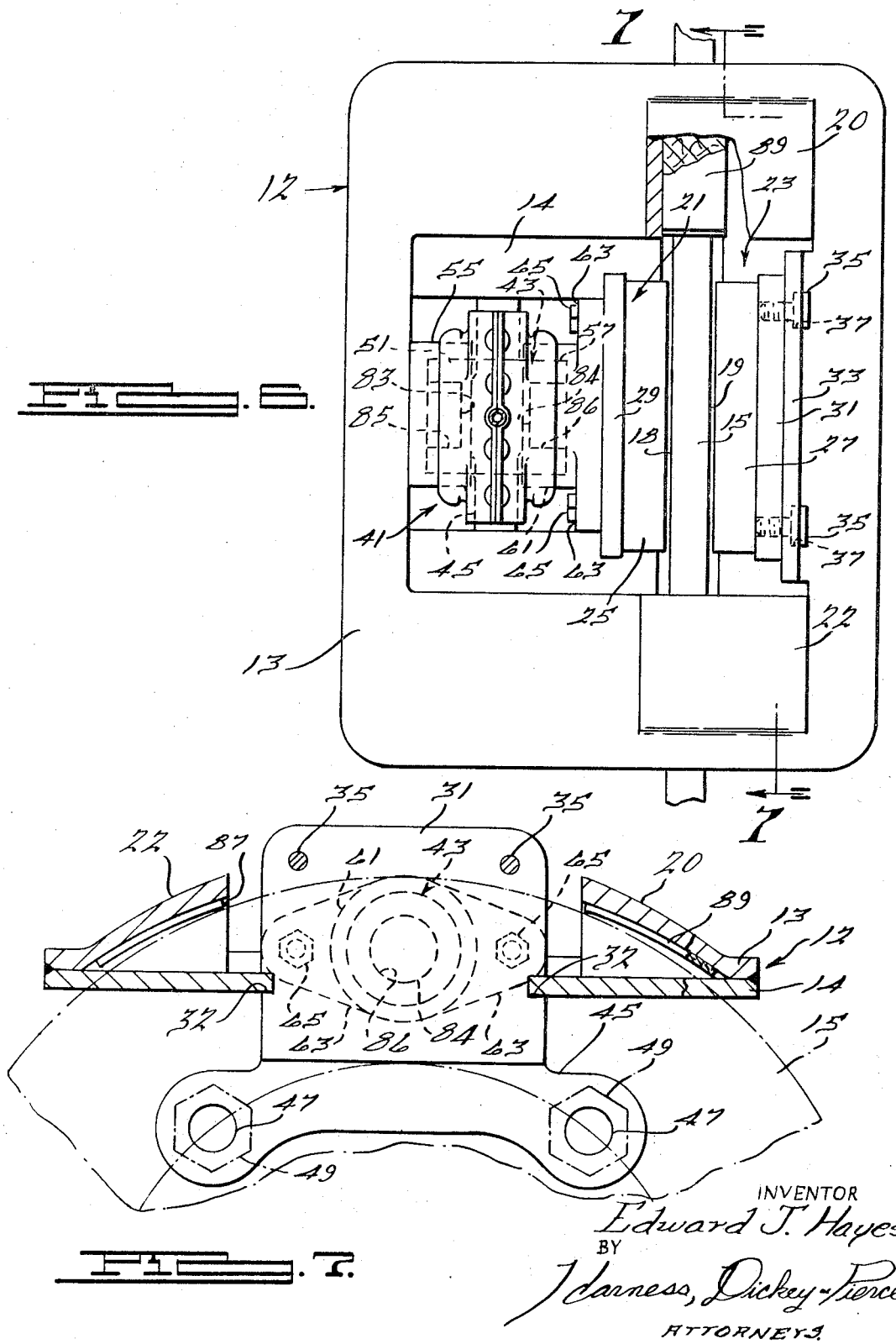

3,326,332
FLOATING YOKE DISC BRAKE
Edward J. Hayes, Livonia, Mich., assignor to Kelsey-Hayes Company, Romulus, Mich., a corporation of Delaware
Filed Feb. 28, 1966, Ser. No. 530,305
12 Claims. (Cl. 188—152)

This invention relates generally to brakes, and particularly to an improved floating yoke disc brake.

The brake to which the present invention relates generally embodies opposed brake shoes movable into frictional engagement with opposite faces of a rotor or disc secured for turning movement with a vehicle wheel. A reaction member or yoke is supported adjacent an arcuate segment of the rotor for floating movement transversely thereto. Hydraulic motor means associated with the yoke acts directly on one of the shoes and motor reaction is taken by the yoke which acts on the other shoe so that when hydraulic pressure is supplied to the motor, the brake shoes frictionally engage the rotor causing the vehicle wheel to slow or stop. Conventionally, the associated motor, yoke and brake shoes are non-turnably supported upon a fixed vehicle part such as a wheel spindle.

When the brake shoes engage the turning rotor, friction between the shoes and rotor tends to move the shoes in the direction the rotor is turning and exerts torque on the shoes, yoke and motor. For smooth operation of the hydraulic motor it is desirable that this torque not react on the machined sliding surfaces of the motor and the seals associated therewith.

In addition, it is important for proper brake operation that the various surfaces of the hydraulic motor be inaccessible to moisture, dirt, grease and other foreign matter which might contaminate these moving parts and reduce operating efficiency of the motor or even prevent the brakes from operating at all.

An important object of the present invention, therefore, is to provide an improved floating yoke disc brake in which the brake torque reaction is taken by means entirely independent of the sliding surfaces of the hydraulic motor components and the seals associated therewith.

Another object is to provide a floating yoke disc brake of the above character wherein the various sliding surfaces of the hydraulic motor are protected from moisture, dirt, grease and other foreign matter.

Further objects include the provision of a floating yoke disc brake of the above character which is relatively inexpensive to manufacture, rugged in construction and reliable in use.

Other objects and advantages of the present invention will become more apparent from a consideration of the following detailed description taken in conjunction with the drawings in which:

FIGURE 1 is a top plan view illustrating a floating yoke disc brake embodying the present invention;

FIG. 2 is a sectional view of FIG. 1 taken along the line 2—2 thereof;

FIG. 3 is a sectional view of FIG. 1 taken along the line 3—3 thereof;

FIG. 4 is a sectional view of FIG. 1 taken along the line 4—4 thereof;

FIG. 5 is a sectional view of FIG. 1 taken along the line 5—5 thereof;

FIG. 6 is a view similar to FIG. 1 illustrating a modified form of the present invention; and FIG. 7 is a sectional view of FIG. 6 taken along the line 7—7 thereof.

Broadly described, the present invention comprises at least two brake shoes disposed in confronting relation to opposite faces of a rotor, a reaction member supported for movement transversely relative to said rotor for pressing one of said brake shoes into frictional engagement with said rotor, fluid motor means associated with said reaction member and having fixed piston means, first movable cylinder means fixed relative to said reaction member and slidably receiving one end of said piston means, second movable cylinder means for pressing the other of said brake shoes into frictional engagement with said rotor and slidably receiving the other end of said piston means, said piston means and said first and second cylinder means having cooperating torque reaction means disposed internally of said first and second cylinder means preventing relative lateral movement therebetween.

Referring now more specifically to the drawings, a floating yoke disc brake embodying the present invention is shown generally at 11 in FIG. 1 and is seen to include a generally rectangular reaction member or yoke 12 disposed in surrounding relation to an arcuate segment of a rotor or disc 15 fixed for rotation with a vehicle wheel (not shown) in the usual manner. The yoke 12 includes juxtaposed rectangular plates 13, 14 welded at their edges as shown, the plate 13 having raised, generally concave shields 20, 22 spaced from the outer edge of the rotor 15. A pair of brake shoes 21, 23 are positioned within the yoke 12 and in confronting relation to opposite radial faces 18, 19 of the rotor 15.

The brake shoes 21, 23 include brake lining 25, 27 riveted or bonded to backing plates 29, 31, respectively, as it customary. The backing plates 29, 31 also are slotted at 30, 32 to snugly but slidably receive the inner portion of the yoke plate 14 as shown in FIGS. 3 and 5. When the brake shoes 21, 23 move toward the rotor 15, the linings 25, 27 frictionally engage the rotor faces 18, 19, respectively, to slow or stop the vehicle wheel (not shown) associated with the rotor 15. The backing plate 31 is fixed to an upstanding flange 33, fixed to or integral with the yoke plate 13, by screws 35 while the backing plate 29 is similarly fixed to a pair of flanges 63 fixed to or integral with a hydraulic cylinder 61 by screws 65 as will be described. Thus, by removing the screws 35, 65, the brake shoes 21, 23 may be removed and replaced when needed.

According to the present invention, a hydraulic motor 41 is provided to motivate the brake shoes 21, 23 and press them into frictional engagement with the surfaces 18, 19 of the rotor 15. This motor 41 is seen to include a piston 43 having a depending bracket 45 welded thereto or integral therewith adapted to be secured to a flange 46 of a conventional wheel spindle by bolts 47 and nuts 49 and slotted at 44 to receive the yoke plate 14 (FIG. 4). One end 51 of the piston 43 is slidably received in a cylindrical bore 53 of a hydraulic cylinder 55 secured to or integral with the yoke 13. The other end 57 of the piston 43 is similarly slidably received in a cylindrical bore 59 of another hydraulic cylinder 61. As described, the cylinder 61 has a pair of flanges 63 secured to the brake shoe backing plate 29 by screws 65. A flexible boot 66 bridges the cylinders 55, 61 and has an intermediate portion surrounding and fixed to the bracket 45 by screws 64 to prevent dirt, grease, and other foreign matter from contaminating the sliding joint between the bores 53, 59 and the piston 43.

In use, pressurized fluid is delivered to the piston 43 from a master cylinder (not shown) connected thereto by a conduit 68 when it is desired to slow or stop the rotor 15 and the vehicle wheel (not shown) associated therewith. This fluid passes through a radial passage 70 and an axial passage 72 in the piston 43 and into the bores 53, 59 of cylinders 55, 61, respectively. The fluid pressure causes the cylinder 61 to move toward the right, as seen in FIGS.

1 and 2, thereby pressing the lining 25 of the brake shoe 21 into frictional engagement with the face 18 of the rotor 15. The reaction to the pressure on the cylinder 61 is exerted on the cylinder 55 within the bore 53 and on the yoke 12 fixed thereto causing the yoke 12 to move toward the left as seen in FIGS. 1 and 2. The yoke flange 33 being fixed to the backing plate 31 presses the lining 27 of the brake shoe 23 into frictional engagement with the face 19 of the rotor 15.

The piston 43 is provided with a pair of annular seals 63a, 65a, one at each end 51, 57, respectively, which sealingly engage the walls of the bores 53, 59, respectively. These seals 63a, 65a may be O-rings, but preferably are seals which are rectangular in cross-section. These seals 63a, 65a are twisted or distorted when the cylinders 55, 61 are pressurized and move toward the left and right, respectively, relative to the piston 43 as described above, so that when the fluid pressure is released, seals 63a, 65a return the cylinders 55, 61 to the position illustrated in FIG. 2 and release the pressure on the brake shoes 21, 23.

When the rotor 15 is turning and the brake shoes 21, 23 are applied, a torque is generated on the cylinders 55, 61 since the brake shoes 21, 23 tend to turn in the same direction as disc rotation. As described above, the piston 43 is fixed against rotation by virtue of its bracket mounting 45 so that this torque can not damage the contacting surfaces of the piston 43 and the cylinders 55, 61 and the seals 63a, 65a.

According to the present invention, the piston ends 51, 57 are provided with axially extending, generally rectangular slots 67, 69 which closely, slidably receive complementary tongue-like axial projections 71, 73 formed in the cylinders 55, 61, respectively. These slots 67, 69 and tongues 71, 73 are of an axial length to remain sufficiently engaged when the cylinders 55, 61 move relative to the piston 43 during brake application and prevent relative turning movement between the piston 43 and the cylinders 55, 61. In addition, the piston 43 and the cylinders 55, 61 cannot move laterally relative to each other so that the torque is reacted on the tongues 71, 73 and the slots 67, 69 and cannot damage the contacting walls of the piston 43 and cylinders 55, 61 and/or the seals 63a, 65a. Furthermore, and perhaps most importantly, the tongues and slots are within the sealed portions of the cylinders 55, 61 and are virtually inaccessible to dirt, grease, or other foreign matter, along with moisture and sub-freezing atmospheric temperature conditions. Thus, virtually no danger exists that these sliding parts can become contaminated and/or frozen.

A modified form of the present invention is illustrated in FIGS. 6 and 7 wherein like numerals refer to like parts. In this embodiment, the cylinders 55, 61 each have an axially extending, generally circular cross-sectional projections 83, 84 slidably disposed in complementary circular slots 85, 86 formed in the piston ends 51, 57, respectively. These cooperating slots 85, 86 and projections 83, 84 prevent relative lateral movement between the piston 43 and the cylinders 55, 61 to provide a torque reaction and prevent damage to the machined walls of the piston 43 and the cylinders 55, 61 and to the seals 63a, 65a in substantially the same manner as the embodiment illustrated in FIGS. 1–5 and described above. However, because of the circular shape of these slots and projections, the cylinders 55, 61 can turn about an axis passing centrally therethrough.

As seen best in FIG. 2, a majority of the area of the brake linings 25, 27 is positioned below the central axis of the cylinders 55, 61 so that when the brakes are applied the cylinders 55, 61 and the yoke 12 rock in a direction opposite to the direction the rotor 15 is turning. As seen in FIG. 7, clockwise turning movement of the rotor 15 causes the yoke 12 to rock counterclockwise about the cylinder axis to bring a brake lining pad 87, fixed to the underside of the shield 22 and normally spaced from the rotor 15 into frictional contact with the outer surface of the rotor 15. The greater this torque, the greater will be the frictional pressure of the pad 87 on the rotor 15 so as to produce a servo-like or self-energizing braking feature. If the rotor 15 is turning counterclockwise as seen in FIG. 7, the yoke 12 rocks in a clockwise direction to bring a pad 89 on the shield 20 into contact with the rotor outer surface in the same manner. In either case, when the brake shoes 21, 23 are released from the rotor 15, the torque force on the cylinders 55, 61 and on the yoke 12 is also released and the yoke returns to the position shown in FIG. 7. In all other respects, the operation of this embodiment is the same as that described for the embodiment of FIGS. 1–5 above.

By the foregoing, there has been disclosed an improved floating yoke disc brake, and while preferred embodiment of the present invention has been illustrated and described above in detail, various additions, substitutions, modifications and omissions may be made thereto without departing from the spirit of the invention as encompassed by the appended claims.

What is claimed is:

1. A disc brake comprising at least two brake shoes disposed in confronting relation to opposite faces of a rotor, a reaction member supported for movement transversely relative to said rotor for pressing one of said brake shoes into frictional engagement with said rotor, fluid motor means associated with said reaction member and having fixed piston means, first movable cylinder means fixed relative to said reaction member and slidably receiving one end of said piston means, second movable cylinder means for pressing the other of said brake shoes into frictional engagement with said rotor and slidably receiving the other end of said piston means, said piston means and said first and second cylinder means having torque reaction means disposed internally of said first and second cylinder means preventing relative lateral movement therebetween.

2. A disc brake as defined in claim 1 wherein said torque reaction means comprises slidable complementary projection and slot means.

3. A disc brake as defined in claim 1 wherein said torque reaction means comprises slidable complementary generally rectangular cross-sectional projection and slot means.

4. A disc brake as defined in claim 1 wherein said torque reaction means comprises slidable complementary projection and slot means formed in said cylinder means and said piston means, respectively.

5. A disc brake as defined in claim 1 wherein said torque reaction means comprises slidable complementary generally circular cross-sectional projection and slot means.

6. A disc brake as defined in claim 1 wherein said torque reaction means comprises slidable complementary generally non-circular cross-sectional projection and slot means.

7. A disc brake as defined in claim 1 wherein said reaction member and said second cylinder means are removably fixed to said one brake shoe and said other brake shoe respectively.

8. A disc brake as defined in claim 1 including means for delivering pressurized fluid to said first and second cylinder means through said fixed piston means.

9. A disc brake as defined in claim 6 wherein said reaction member and said second cylinder means are removably fixed to said one brake shoe and said other brake shoe respectively and wherein said reaction member is slidably and non-rotatably associated with said piston means.

10. A disc brake as defined in claim 1 wherein said reaction member is provided with brake lining means normally in spaced confronting relation to the outer surface of said rotor, said reaction member adapted for turning about an axis transverse to said rotor when said at least two brake shoes frictionally engage said rotor faces whereby to bring said brake lining means into frictional engagement with said rotor outer surface.

11. A disc brake as defined in claim 1 wherein said reaction member is provided with spaced brake lining means normally in spaced confronting relation to the outer surface of said rotor, said reaction member adapted for turning about an axis transverse to said rotor in a direction opposite to the direction of turning movement of said rotor when said at least two brake shoes frictionally engage said rotor faces whereby to bring one of said brake lining means into frictional engagement with said rotor outer surface.

12. A disc brake as defined in claim 5 wherein said reaction member is provided with concave brake lining means normally in spaced confronting relation to the outer surface of said rotor, said reaction member being non-rotatably associated with said first and second brake shoe means and adapted for turning about an axis transverse to said rotor when said at least two brake shoes frictionally engage said rotor faces whereby to bring said brake lining means into frictional engagement with said rotor outer surface.

References Cited
UNITED STATES PATENTS

| | | | |
|---|---|---|---|
| 2,711,802 | 6/1955 | Davis | 188—152 X |
| 2,906,375 | 9/1959 | Mossey | 188—70 |
| 3,245,500 | 4/1966 | Hambling et al. | 188—73 |

MILTON BUCHLER, *Primary Examiner.*

G. E. HALVOSA, *Examiner.*